US007039588B2

(12) United States Patent
Okutani et al.

(10) Patent No.: US 7,039,588 B2
(45) Date of Patent: May 2, 2006

(54) SYNTHESIS UNIT SELECTION APPARATUS AND METHOD, AND STORAGE MEDIUM

(75) Inventors: Yasuo Okutani, Kanagawa (JP); Yasuhiro Komori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/928,114

(22) Filed: Aug. 30, 2004

(65) Prior Publication Data

US 2005/0027532 A1 Feb. 3, 2005

Related U.S. Application Data

(62) Division of application No. 09/818,581, filed on Mar. 28, 2001, now Pat. No. 6,980,955.

(30) Foreign Application Priority Data

Mar. 31, 2000 (JP) ............................ 2000-099420

(51) Int. Cl.
*G10L 15/00* (2006.01)

(52) U.S. Cl. ...................................... 704/258; 704/260

(58) Field of Classification Search ................ 704/200, 704/260, 258

See application file for complete search history.

(56) References Cited

U.S. PATENT DOCUMENTS 5,633,984 A 5/1997 Aso et al.
5,787,396 A 7/1998 Komori et al. ............. 704/256
5,797,116 A 8/1998 Yamada et al. ............... 704/10
5,812,975 A 9/1998 Komori et al. ............. 704/256
5,845,047 A 12/1998 Fukada et al. ............. 395/2.77
5,913,193 A 6/1999 Huang et al. ............... 704/258
5,956,679 A 9/1999 Komori et al. ............. 704/256
5,970,445 A 10/1999 Yamamoto et al. .......... 704/230
6,021,388 A 2/2000 Otsuka et al. .............. 704/268
6,076,061 A 6/2000 Kawasaki et al. .......... 704/270
6,108,628 A 8/2000 Komori et al. ............. 704/256
6,163,769 A 12/2000 Acero et al. ................ 704/260
6,240,384 B1 * 5/2001 Kagoshima et al. ........ 704/220
6,366,883 B1 4/2002 Campbell et al. ........... 704/260
6,405,169 B1 6/2002 Kondo et al. ............... 704/258
6,546,367 B1 4/2003 Otsuka
6,665,641 B1 12/2003 Coorman et al. ........... 704/260
2001/0032079 A1 10/2001 Okutani et al. ............. 704/258
2002/0051955 A1 5/2002 Okutani et al. ............. 434/185

* cited by examiner

*Primary Examiner*—Daniel Abebe
(74) *Attorney, Agent, or Firm*—Fitzpatrick, Cella, Harper & Scinto

(57) ABSTRACT

Input text data undergoes language analysis to generate prosody, and a speech database is searched for a synthesis unit on the basis of the prosody. A modification distortion of the found synthesis unit, and concatenation distortions upon connecting that synthesis unit to those in the preceding phoneme are computed, and a distortion determination unit weights the modification and concatenation distortions to determine the total distortion. An Nbest determination unit obtains N best paths that can minimize the distortion using the A* search algorithm, and a registration unit determination unit selects a synthesis unit to be registered in a synthesis unit inventory on the basis of the N best paths in the order of frequencies of occurrence, and registers it in the synthesis unit inventory.

9 Claims, 14 Drawing Sheets

FIG. 12

| a.r \ r.i | id1 | id2 | id3 | id4 | id5 | ... |
|---|---|---|---|---|---|---|
| id1 | 13.2 | 2.6 | ... | | | |
| id2 | 22 | 11.2 | | | | |
| id3 | 5 | 3.6 | | | | |
| id4 | 0 | 4 | | | | |
| id5 | 3.3 | ... | | | | |
| ... | | | | | | |
| | | | | | | |
| | | | | | | |
| | | | | | | |
| | | | | | | |
| | | | | | | |
| | | | | | | |
| | | | | | | |
| | | | | | | |
| | | | | | | |

FIG. 13

PHONETIC DURATION

FUNDAMENTAL FREQUENCY

| | $\mu-2\sigma$ | $\mu-\sigma$ | $\mu$ | $\mu+\sigma$ | $\mu+2\sigma$ |
|---|---|---|---|---|---|
| $\mu-2\sigma$ | 26 | 25 | 15 | 13 | 14 |
| $\mu-\sigma$ | 20 | 24 | 19 | 18 | 17 |
| $\mu$ | 15 | 19 | 10 | 13 | 20 |
| $\mu+\sigma$ | 19 | 22 | 16 | 22 | 26 |
| $\mu+2\sigma$ | 25 | 27 | 26 | 30 | 31 |

SYNTHESIS UNIT SELECTION APPARATUS AND METHOD, AND STORAGE MEDIUM

This is a divisional application of application Ser. No. 09/818,581, filed Mar. 28, 2001 now U.S. Pat. No. 6,980, 955.

FIELD OF THE INVENTION

The present invention relates to a speech synthesis apparatus and method for forming a synthesis unit inventory used in speech synthesis, and a storage medium.

BACKGROUND OF THE INVENTION

In speech synthesis apparatuses that produce synthetic speech on the basis of text data, a speech synthesis method which pastes and modifies synthesis units at desired pitch intervals while copying and/or deleting them in units of pitch waveforms (PSOLA: Pitch Synchronous Overlap and Add), and produces synthetic speech by concatenating these synthesis units is becoming popular today.

Synthetic speech produced by exploiting such technique contains a distortion due to modifying of synthesis units (to be referred to as a modification distortion hereinafter) and a distortion due to concatenations of synthesis units (to be referred to as a concatenation distortion hereinafter). Such two different distortions seriously cause deterioration of the quality of synthetic speech. When the number of synthesis units that can be registered in a synthesis unit inventory is limited, it is nearly impossible to select synthesis units which reduce such distortions. Especially, when only one synthesis unit can be registered in a synthesis unit inventory in correspondence with one phonetic environment, it is totally impossible to select synthesis units which reduce the distortions. If such synthesis unit inventory is used, the quality of synthetic speech deteriorates inevitably due to the modification and concatenation distortions.

SUMMARY OF THE INVENTION

The present invention has been made in consideration of the aforementioned prior art, and has as its object to provide a speech synthesis apparatus and method, which suppress deterioration of synthetic speech quality by selecting synthesis units to be registered in a synthesis unit inventory in consideration of the influences of concatenation and modification distortions.

The present invention is described with use of synthesis unit and synthesis unit inventory of synthesis units and synthesis unit inventory. The synthesis unit represents a part for speech synthesis, and the synthesis unit can be called as a synthesis unit.

In order to attain the objects, a speech synthesis apparatus of the present invention, comprising: distortion output means for obtaining a distortion produced upon modifying a synthesis unit on the basis of predetermined prosody information; and unit registration means for selecting a synthesis unit to be registered in a synthesis unit inventory used in speech synthesis on the basis of the distortion output from said distortion output means.

In order to attain the objects, a speech synthesis method of the present invention, comprising: a distortion output step of obtaining a distortion produced upon modifying a synthesis unit on the basis of predetermined prosody information; and a unit registration step of selecting a synthesis unit to be registered in a synthesis unit inventory used in speech synthesis on the basis of the distortion output from the distortion output step.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 12 shows an example of the table format that determines concatenation distortions between candidates of /a.r/ and candidates of /r.i/ of a diphone according to the 12th embodiment of the present invention;

FIG. 13 shows an example of a table showing modification distortions according to the 13th embodiment of the present invention.

DETAILED DESCRIPTION OF THE PREFERRED EMBODIMENTS

Preferred embodiments of the present invention will be described in detail hereinafter with reference to the accompanying drawings.

First Embodiment

Figure 1:
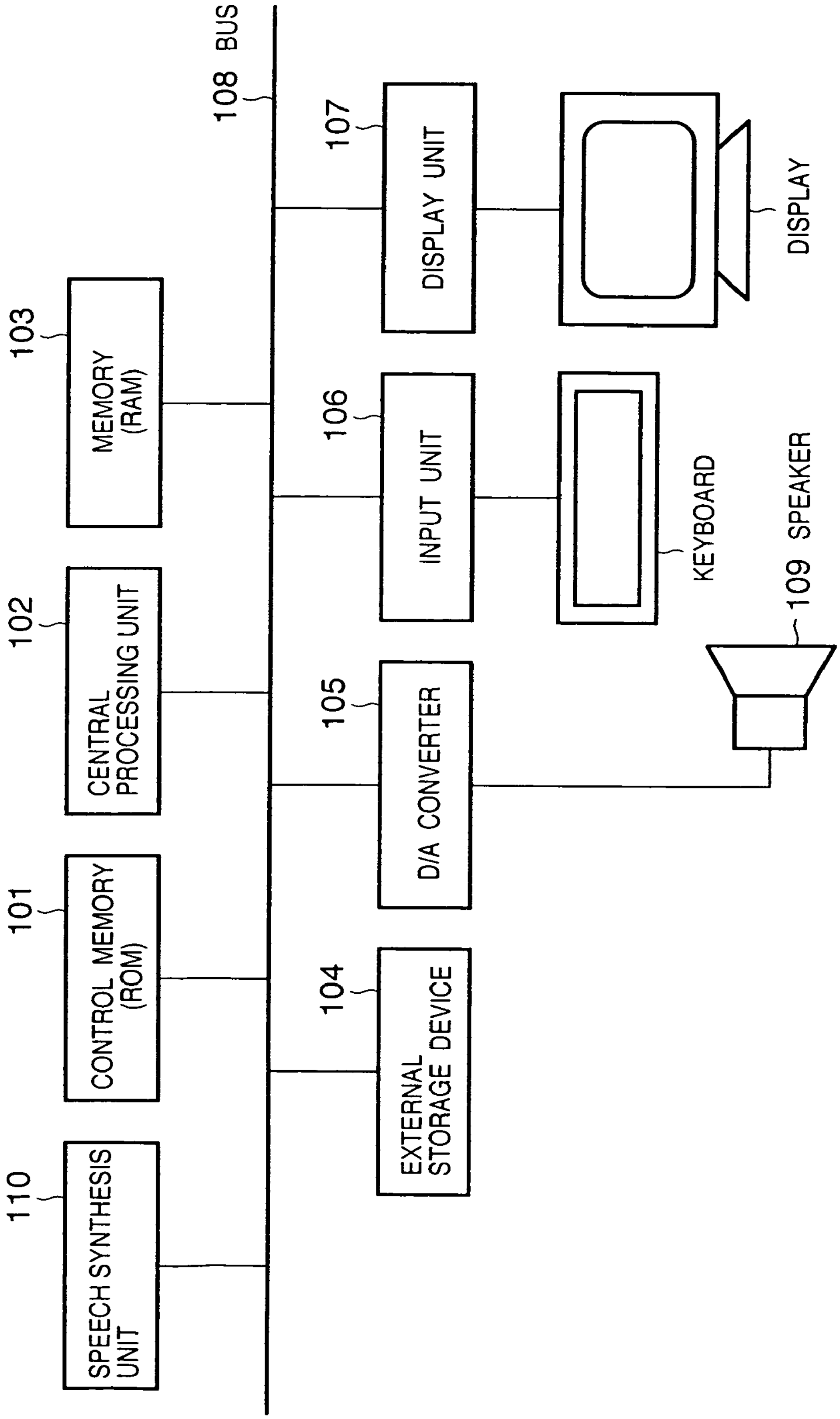
FIG. 1 is a block diagram showing the hardware arrangement of a speech synthesis apparatus according to an embodiment of the present invention.

FIG. 1 is a block diagram showing the hardware arrangement of a speech synthesis apparatus according to an embodiment of the present invention. Note that this embodiment will exemplify a case wherein a general personal computer is used as a speech synthesis apparatus, but the present invention can be practiced using a dedicated speech synthesis apparatus or other apparatuses.

Referring to FIG. 1, reference numeral 101 denotes a control memory (ROM) which stores various control data used by a central processing unit (CPU) 102. The CPU 102 controls the operation of the overall apparatus by executing a control program stored in a RAM 103. Reference numeral 103 denotes a memory (RAM) which is used as a work area upon execution of various control processes by the CPU 102 to temporarily save various data, and loads and stores a control program from an external storage device 104 upon executing various processes by the CPU 102. This external storage device includes, e.g., a hard disk, CD-ROM, or the like. Reference numeral 105 denotes a D/A converter for converting input digital data that represents a speech signal into an analog signal, and outputting the analog signal to a speaker 109. Reference numeral 106 denotes an input unit which comprises, e.g., a keyboard and a pointing device such as a mouse or the like, which are operated by the operator. Reference numeral 107 denotes a display unit which comprises a CRT display, liquid crystal display, or the like. Reference numeral 108 denotes a bus which connects those units. Reference numeral 110 denotes a speech synthesis unit.

In the above arrangement, a control program for controlling the speech synthesis unit 110 of this embodiment is loaded from the external storage device 104, and is stored on the RAM 103. Various data used by this control program are stored in the control memory 101. Those data are fetched onto the memory (RAM) 103 as needed via the bus 108 under the control of the CPU 102, and are used in the control processes of the CPU 102. A control program including program codes of process implemented in the speech synthesis unit 110 may be loaded from the external storage device 104 and stored into the memory (RAM) 103 and the CPU 102 performs the processing along with the control program, such that the CPU 102 and the RAM 103 can implement the function of the speech synthesis unit 110. The D/A converter 105 converts speech waveform data produced by executing the control program into an analog signal, and outputs the analog signal to the speaker 109.

Figure 2:
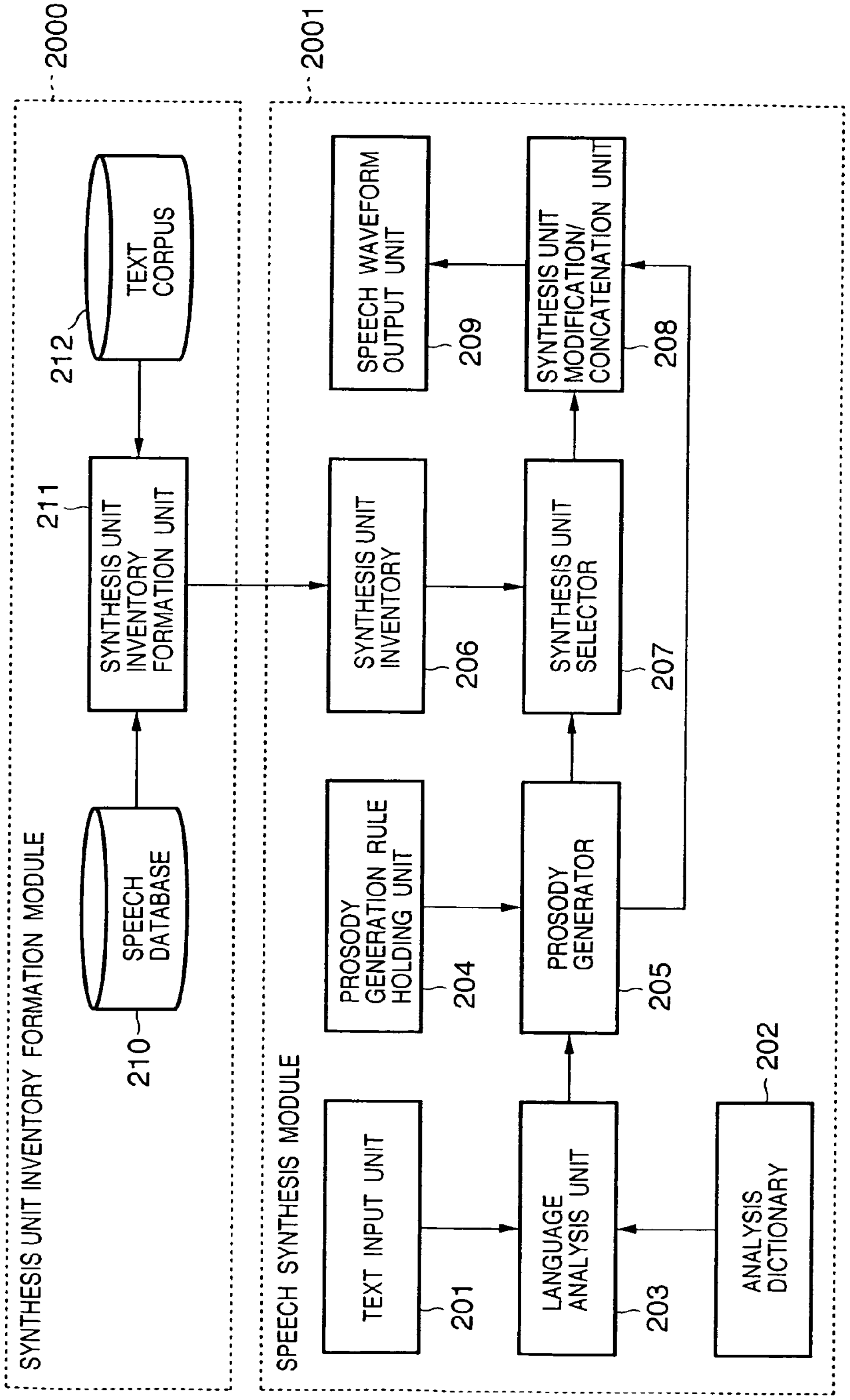
FIG. 2 is a block diagram showing the module arrangement of a speech synthesis apparatus according to the first embodiment of the present invention.

FIG. 2 is a block diagram showing the module arrangement of the speech synthesis unit 110 according to this embodiment. The speech synthesis unit 110 roughly has two modules, i.e., a synthesis unit inventory formation module 2000 for executing a process for registering synthesis units in a synthesis unit inventory 206, and a speech synthesis module 2001 for receiving text data, and executing a process for synthesizing and outputting speech corresponding to that text data.

Referring to FIG. 2, reference numeral 201 denotes a text input unit for receiving arbitrary text data from the input unit 106 or external storage device 104; numeral 202 denotes an analysis dictionary; numeral 203 denotes a language analyzer; numeral 204 denotes a prosody generation rule holding unit; numeral 205 denotes a prosody generator; numeral 206 denotes a synthesis unit inventory; numeral 207 denotes a synthesis unit selector; numeral 208 denotes a synthesis unit modification/concatenation unit; numeral 209 denotes a speech waveform output unit; numeral 210 denotes a speech database; numeral 211 denotes a synthesis unit inventory formation unit; and numeral 212 denotes a text corpus. Text data of various contents can be input to the text corpus 212 via the input unit 106 and the like.

The speech synthesis module 2001 will be explained first. In the speech synthesis module 2001, the language analyzer 203 executes language analysis of text input from the text input unit 201 by looking up the analysis dictionary 202. The analysis result is input to the prosody generator 205. The prosody generator 205 generates a phonetic string and prosody information on the basis of the analysis result of the language analyzer 203 and information that pertains to prosody generation rules held in the prosody generation rule holding unit 204, and outputs them to the synthesis unit selector 207 and synthesis unit modification/concatenation unit 208. Subsequently, the synthesis unit selector 207 selects corresponding synthesis units from those held in the synthesis unit inventory 206 using the prosody generation result input from the prosody generator 205. The synthesis unit modification/concatenation unit 208 modifies and concatenates synthesis units output from the synthesis unit selector 207 in accordance with the prosody generation result input from the prosody generator 205 to generate a speech waveform. The generated speech waveform is output by the speech waveform output unit 209.

The synthesis unit inventory formation module 2000 will be explained below.

In this module 2000, the synthesis unit inventory formation unit 211 selects synthesis units from the speech database 210 and registers them in the synthesis unit inventory 206 on the basis of a procedure to be described later.

A speech synthesis process of this embodiment with the above arrangement will be described below.

Figure 3:
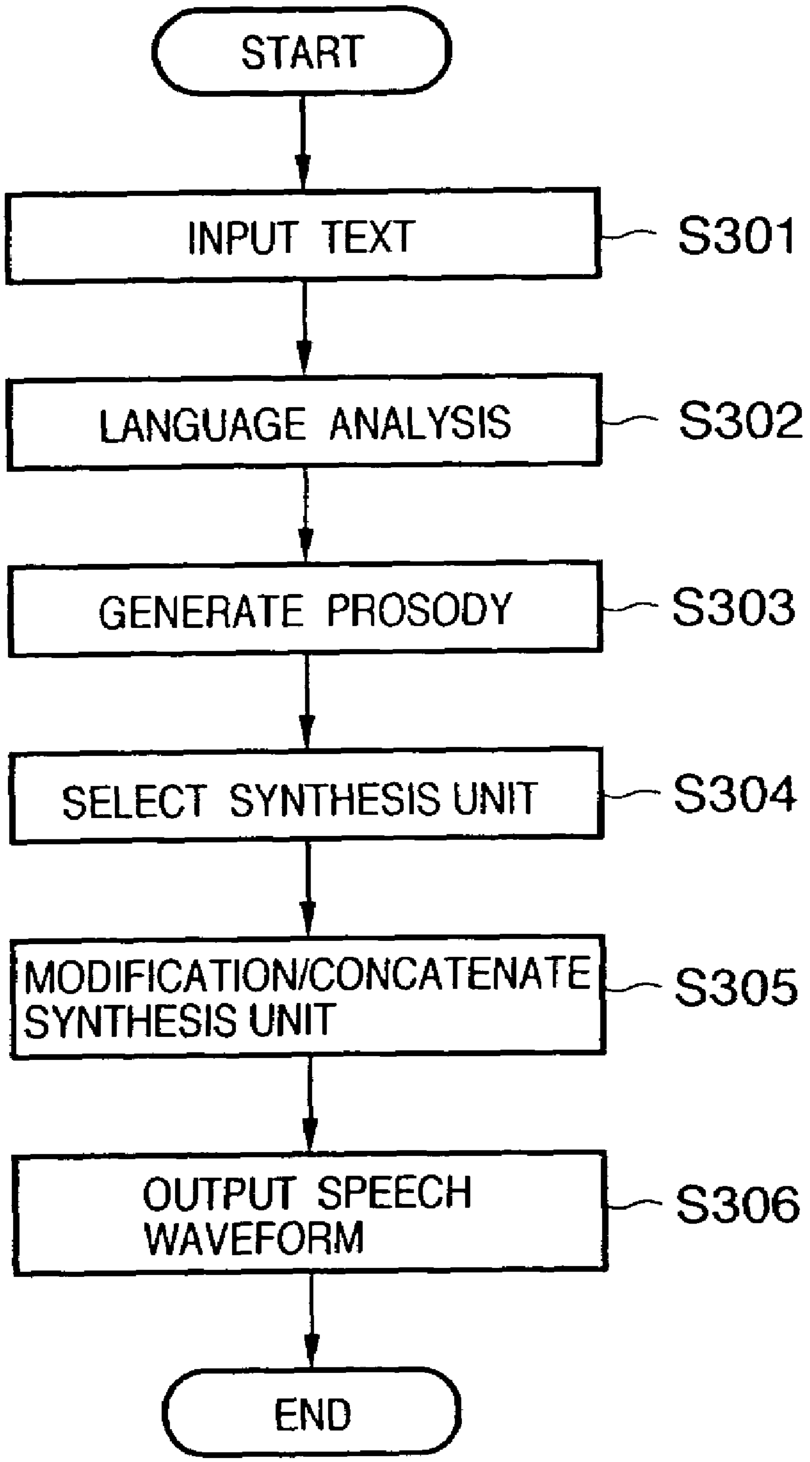
FIG. 3 is a flow chart showing the flow of processing in an on-line module according to the first embodiment.

FIG. 3 is a flow chart showing the flow of a speech synthesis process (on-line process) in the speech synthesis module 2001 shown in FIG. 2.

In step S301, the text input unit 201 inputs text data in units of sentences, clauses, words, or the like, and the flow advances to step S302. In step S302, the language analyzer 203 executes language analysis of the text data. The flow advances to step S303, and the prosody generator 205 generates a phonetic string and prosody information on the basis of the analysis result obtained in step S302, and predetermined prosodic rules. The flow advances to step S304, and the synthesis unit selector 207 selects for each phonetic string synthesis units registered in the synthesis unit inventory 206 on the basis of the prosody information obtained in step S303 and the phonetic environment. The flow advances to step S305, and the synthesis unit modification/concatenation unit 208 modifies and concatenates synthesis units on the basis of the selected synthesis units and the prosody information generated in step S303. The flow then advances to step S306. In step S306, the speech waveform output unit 209 outputs a speech waveform produced by the synthesis unit modification/concatenation unit 208 as a speech signal. In this way, synthetic speech corresponding to the input text is output.

Figure 4:
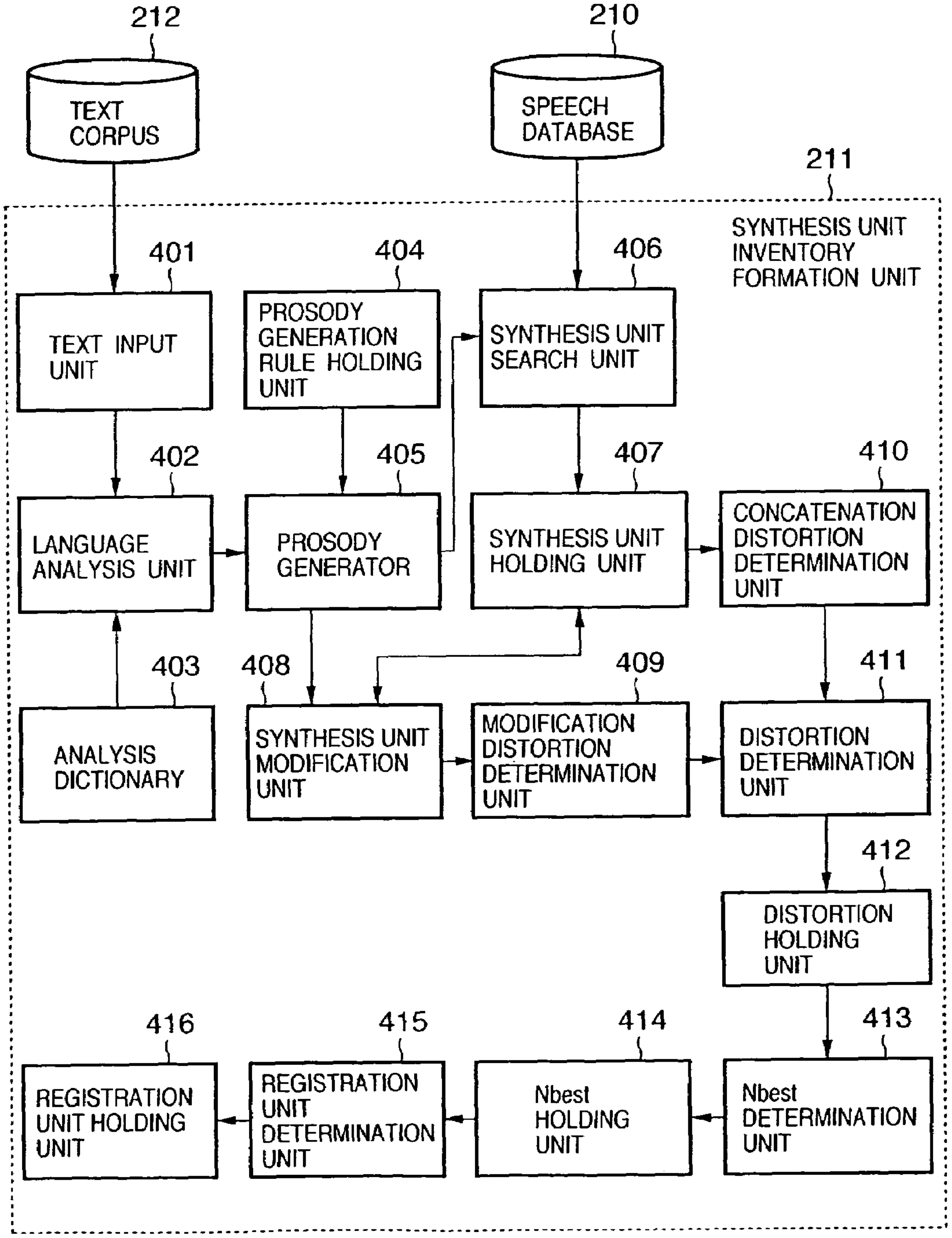
FIG. 4 is a block diagram showing the detailed arrangement of an off-line module according to the first embodiment.

FIG. 4 is a block diagram showing the more detailed arrangement of the synthesis unit inventory formation module 2000 in FIG. 2. The same reference numerals in FIG. 4 denote the same parts as in FIG. 2, and FIG. 4 shows the arrangement of the synthesis unit inventory formation unit 211 as a characteristic feature of this embodiment in more detail.

Referring to FIG. 4, reference numeral 401 denotes a text input unit; numeral 402 denotes a language analyzer; numeral 403 denotes an analysis dictionary; numeral 404 denotes a prosody generation rule holding unit; numeral 405 denotes a prosody generator; numeral 406 denotes a synthesis unit search unit; numeral 407 denotes a synthesis unit holding unit; numeral 408 denotes a synthesis unit modification unit; numeral 409 denotes a modification distortion determination unit; numeral 410 denotes a concatenation distortion determination unit; numeral 411 denotes a distortion determination unit; numeral 412 denotes a distortion holding unit; numeral 413 denotes an Nbest determination unit; numeral 414 denotes an Nbest holding unit; numeral 415 denotes a registration unit determination unit; and numeral 416 denotes a registration unit holding unit.

The module 2000 will be described in detail below.

The text input unit 401 reads out text data from the text corpus 212 in units of sentences, and outputs the readout data to the language analyzer 402. The language analyzer 402 analyzes text data input from the text input unit 401 by looking up the analysis dictionary 403. The prosody generator 405 generates a phonetic string on the basis of the analysis result of the language analyzer 402, and generates prosody information by looking up prosody generation rules (accent patterns, natural falling components, pitch patterns, and the like) held by the prosody generation rule holding unit 404. The synthesis unit search unit 406 searches the speech database 210 for synthesis units, that consider a specific phonetic environment, in accordance with the prosody information and phonetic string generated by the prosody generator 405. The found synthesis units are temporarily held by the synthesis unit holding unit 407. The synthesis unit modification unit 408 modifies the synthesis units held in the synthesis unit holding unit 407 in correspondence with the prosody information generated by the prosody generator 405. The modification process includes a process for concatenating synthesis units in correspondence with the prosody information, a process for modifying synthesis units by partially deleting them upon concatenating synthesis units, and the like.

The modification distortion determination unit 409 determines a modification distortion from a change in acoustic feature before and after modification of synthesis units. The concatenation distortion determination unit 410 determines a concatenation distortion produced when two synthesis units are concatenated, on the basis of an acoustic feature near the terminal end of a preceding synthesis unit in a phonetic string, and that near the start end of the synthesis unit of interest. The distortion determination unit 411 determines a total distortion (also referred to as a distortion value) of each phonetic string in consideration of the modification distortion determined by the modification distortion determination unit 409 and the concatenation distortion determined by the concatenation distortion determination unit 410. The distortion holding unit 412 holds the distortion value that reaches each synthesis unit, which is determined by the distortion determination unit 411. The Nbest determination unit 413 obtains N best paths, which can minimize the distortion for each phonetic string, using an A* (a star) search algorithm. The Nbest holding unit 414 holds N optimal paths obtained by the Nbest determination unit 413 for each input text. The registration unit determination unit 415 selects synthesis units to be registered in the synthesis unit inventory 206 in the order of frequencies of occurrence on the basis of Nbest results in units of phonemes, which are held in the Nbest holding unit 414. The registration unit holding unit 416 holds the synthesis units selected by the registration unit determination unit 415.

Figure 5:
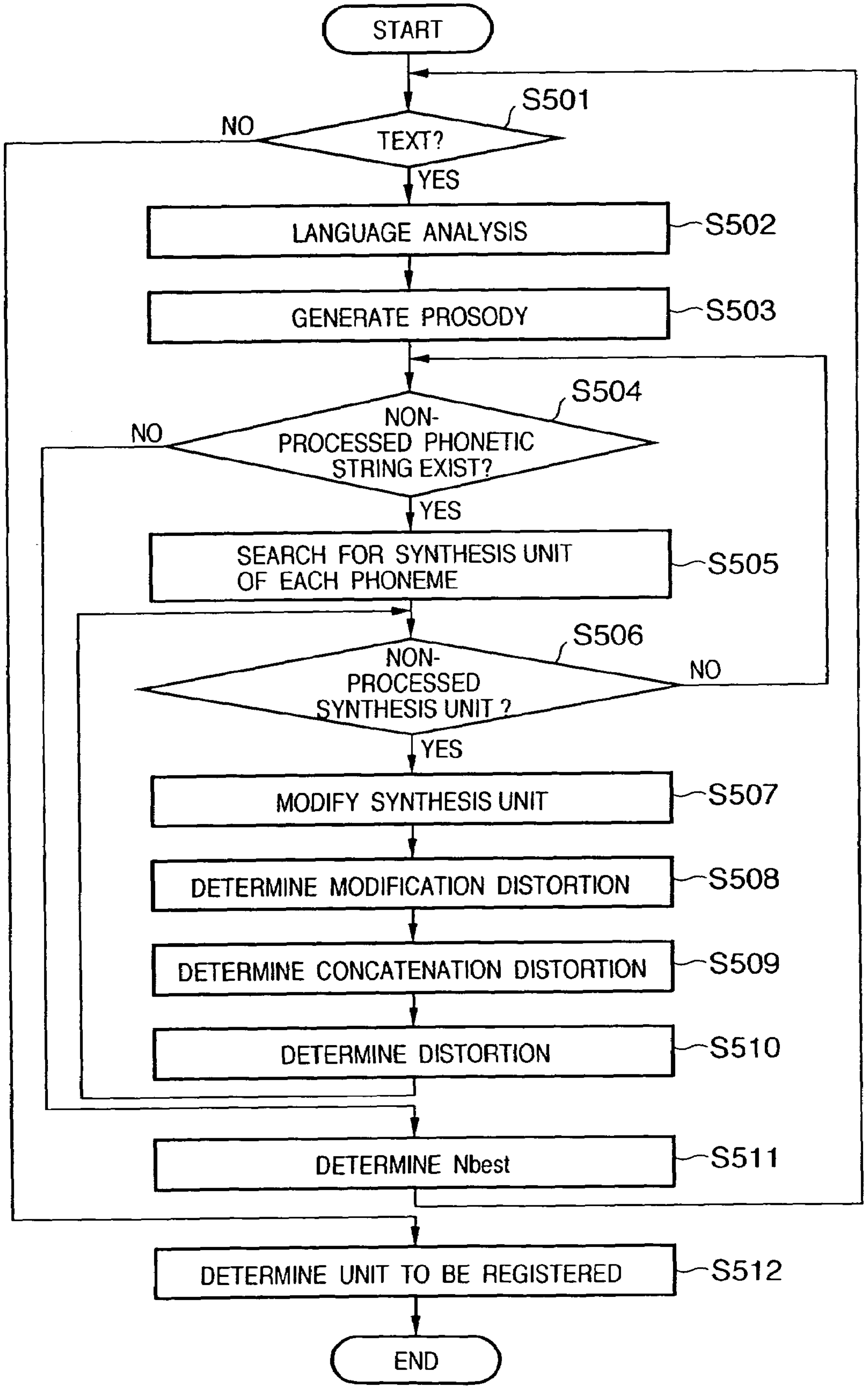
FIG. 5 is a flow chart showing the flow of processing in the off-line module according to the first embodiment.

FIG. 5 is a flow chart showing the flow of processing in the synthesis unit inventory formation module 2000 shown in FIG. 4.

In step S501, the text input unit 401 reads out text data from the text corpus 212 in units of sentences. If no text data to be read out remains, the flow jumps to step S512 to finally determine synthesis units to be registered. If text data to be read out remain, the flow advances to step S502, and the language analyzer 402 executes language analysis of the input text data using the analysis dictionary 403. The flow then advances to step S503. In step S503, the prosody generator 405 generates prosody information and a phonetic string on the basis of the prosody generation rules held by the prosody generation rule holding unit 404 and the language analysis result in step S502. The flow advances to step S504 to process a phoneme in the phonetic string in the phonetic string generated in step S503 in turn. If no phoneme to be processed remains in step S504, the flow jumps to step S511; otherwise, the flow advances to step S505. In step S505, the synthesis unit search unit 406 searches for each phoneme the speech database 210 for synthesis units which satisfy a phonetic environment and prosody rules, and saves the found synthesis units in the synthesis unit holding unit 407.

An example will be explained below. If text data "Aly* こんにちは" (Japanese text "kon-nichi wa" which comprises five words) is input, that data undergoes language analysis to generate prosody information containing accents, intonations, and the like. This text data "Aly* こんにちは" is decomposed into the following phoneme if diphones are used as phonetic units: Aly* こ ん に ち は

/k k.o o.X X.n n.i i.t t.i i.w w.a a/

Note that "X" indicates a sound "ん", and "/" indicates silence.

The flow advances to step S506 to sequentially process a plurality of synthesis units found by search. If no synthesis unit to be processed remains, the flow returns to step S504 to process the next phoneme; otherwise, the flow advances to step S507 to process a synthesis unit of the current phoneme. In step S507, the synthesis unit modification unit 408 modifies the synthesis unit using the same scheme as that in the aforementioned speech synthesis process. The synthesis unit modification process includes, for example, pitch synchronous overlap and add (PSOLA), and the like. The synthesis unit modification process uses that synthesis unit and prosody information. Upon completion of modifying of the synthesis unit, the flow advances to step S508. In step S508, the modification distortion determination unit 409 computes a change in acoustic feature before and after modification of the current synthesis unit as a modification distortion (this process will be described in detail later). The flow advances to step S509, and the concatenation distortion determination unit 410 computes concatenation distortions between the current synthesis unit and all synthesis units of the preceding phoneme (this process will be described in detail later). The flow advances to step S510, and the distortion determination unit 411 determines the distortion values of all paths that reach the current synthesis unit on the basis of the modification and concatenation distortions (this process will be described later). N (N: the number of Nbest to be obtained) best distortion values of a path that reaches the current synthesis unit, and a pointer to a synthesis unit of the preceding phoneme, which represents that path, are held in the distortion holding unit 412. The flow then returns to step S506 to check if synthesis units to be processed remain in the current phoneme.

If all synthesis units in each phoneme are processed in step S506, and if all phonemes are processed in step S504, the flow proceeds to step S511. In step S511, the Nbest determination unit 413 makes an Nbest search using the A* search algorithm to obtain N best paths (to be also referred to as synthesis unit sequences), and holds them in the Nbest holding unit 414. The flow then returns to step S501.

Upon completion of processing for all the text data, the flow jumps from step S501 to step S512, and the registration unit determination unit 415 selects synthesis units with a predetermined frequency of occurrence or higher on the basis of the Nbest results of all the text data for each phoneme. Note that the value N of Nbest is empirically given by, e.g., exploratory experiments or the like. The synthesis units determined in this manner are registered in the synthesis unit inventory 206 via the registration unit holding unit 416.

Figure 6:
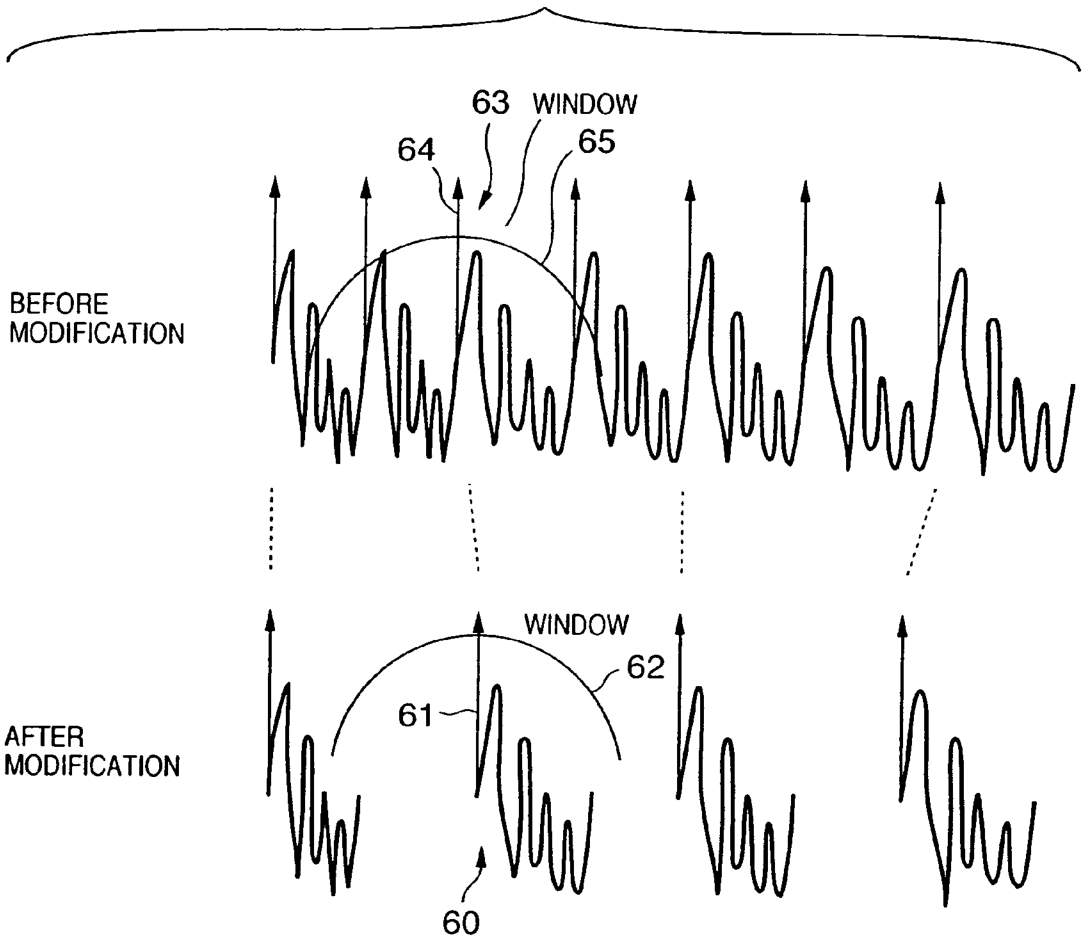
FIG. 6 is a view for explaining modification of synthesis units according to the first embodiment of the present invention.

FIG. 6 is a view for explaining the method of obtaining the modification distortion in step S508 in FIG. 5 according to this embodiment.

FIG. 6 illustrates a case wherein the pitch interval is broadened by the PSOLA scheme. The arrows indicate pitch marks, and the dotted lines represent the correspondence between pitch segments before and after modification. In this embodiment, the modification distortion is expressed based on the cepstrum distance of each pitch unit (to be also referred to as a micro unit) before and after modification. More specifically, a Hanning window 62 (window duration=25.6 msec) is applied to have a pitch mark 61 of a given pitch unit (e.g., 60) after modification as the center, so as to extract that pitch unit 60 as well as neighboring pitch units. The extracted pitch unit 60 undergoes cepstrum analysis. Then, a pitch unit is extracted by applying a Hanning window 65 having the same window duration to have a pitch mark 64 of a pitch unit 63 before modification, which corresponds to the pitch mark 61, as the center, and a cepstrum is obtained in the same manner as that after modification. The distance between the obtained cepstra is determined to be the modification distortion of the pitch unit 60 of interest. That is, a value obtained by dividing the sum total of modification distortions between pitch units after modification and corresponding pitch units before modification by the number Np of pitch units adopted in PSOLA is used as a modification distortion of that synthesis unit. The modification distortion can be described by:

$$Dm = \sum_{i=1}^{Np} \sum_{j=0}^{16} |Corgi,\ j - Ctari,\ j| / Np$$

where Ctar i,j represents the j-th element of a cepstrum of the i-th pitch segment after modification, and Corg i,j similarly represents the j-th element of a cepstrum of the i-th pitch segment before modification corresponding to that after modification.

Figure 7:
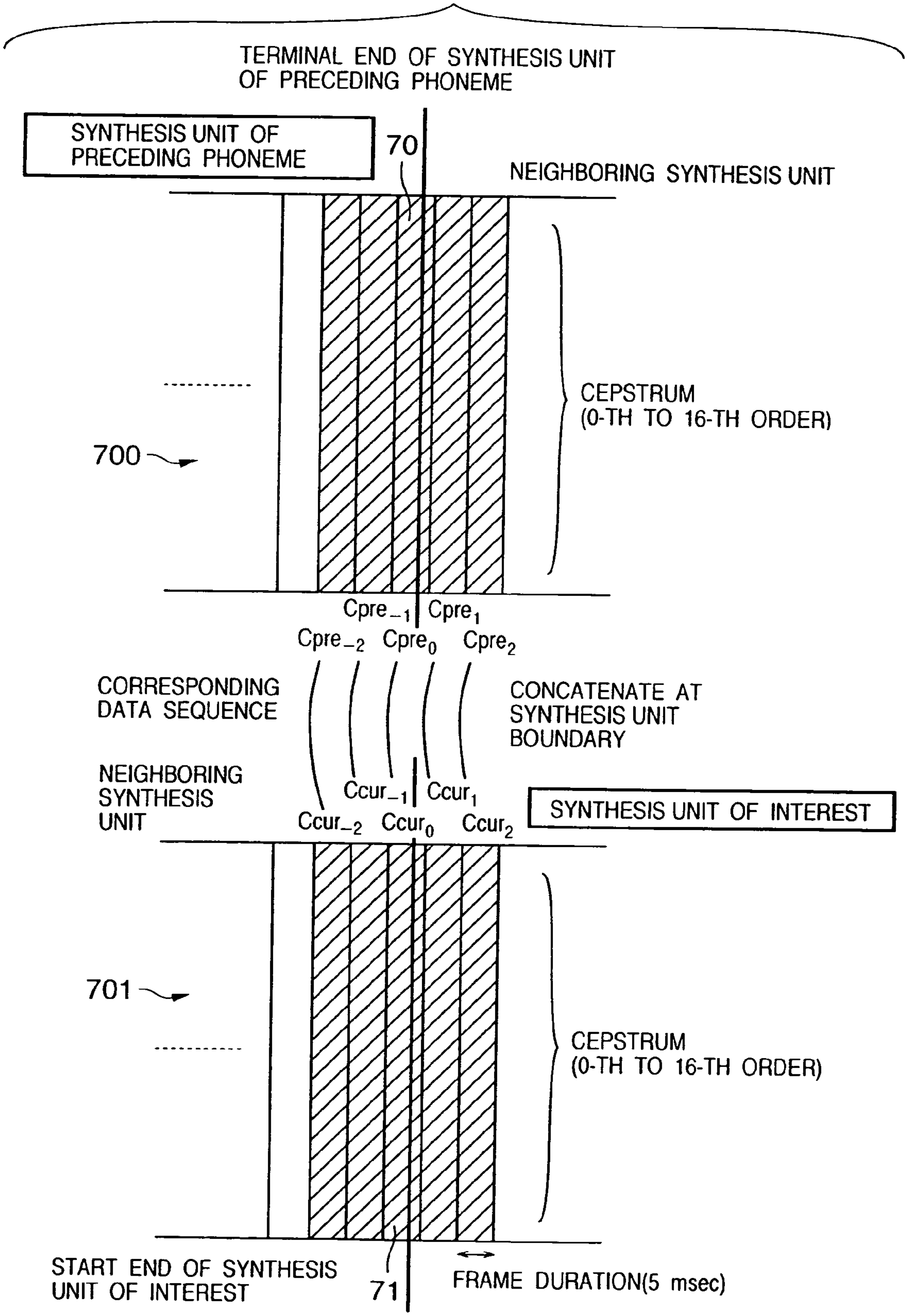
FIG. 7 is a view for explaining a concatenation distortion of synthesis units according to the first embodiment of the present invention.

FIG. 7 is a view for explaining the method of obtaining the concatenation distortion in this embodiment.

This concatenation distortion indicates a distortion produced at a concatenation point between a synthesis unit of the preceding phoneme and the current synthesis unit, and is expressed using the cepstrum distance. More specifically, a total of five frames, i.e., a frame 70 or 71 (frame duration=5 msec, analysis window width=25.6 msec) that includes a synthesis unit boundary, and two each preceding and succeeding frames are used as objects from which a concatenation distortion is to be computed. Note that a cepstrum is defined by a total of 17-dimensional vector elements from 0-th order (power) to 16-th order (power). A sum of absolute values of differences of these cepstrum vector elements is determined to be the concatenation distortion of the synthesis unit of interest. That is, as indicated by 700 in FIG. 7, let Cpre i,j (i: the frame number, frame number "0" indicates a frame including the synthesis unit boundary, j: the element number of the vector) be elements of a cepstrum vector at the terminal end portion of a synthesis unit of the preceding phoneme. Also, as indicated by 701 in FIG. 7, let Ccur i,j be elements of a cepstrum vector at the start end portion of the synthesis unit of interest. Then, a concatenation distortion Dc of the synthesis unit of interest is described by:

$$Dc = \sum_{i=-2}^{2} \sum_{j=0}^{16} |Cprei,\ j - Ccuri,\ j|$$

Figure 8:
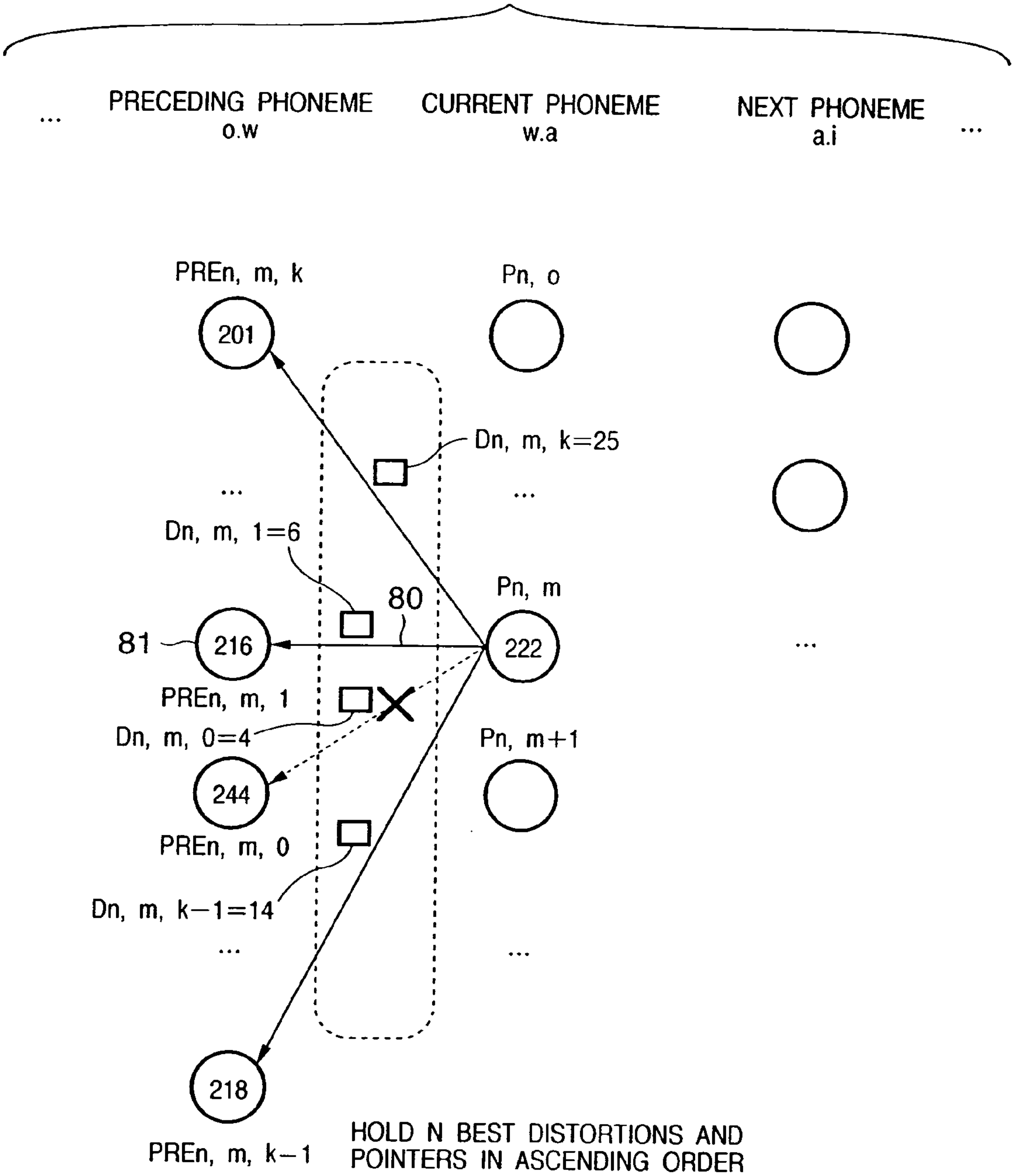
FIG. 8 is a view for explaining the determination process of distortions in synthesis units.

FIG. 8 illustrates the determination process of a distortion in synthesis units by the distortion determination unit 411 according to this embodiment. In this embodiment, diphones are used as phonetic units.

In FIG. 8, one circle indicates one synthesis unit in a given phoneme, and a numeral in the circle indicates the minimum value of the sum totals of distortion values that reach this synthesis unit. A numeral bounded by a rectangle indicates a distortion value between a synthesis unit of the preceding phoneme, and that of the phoneme of interest. Also, each arrow indicates the relation between a synthesis unit of the preceding phoneme, and that of the phoneme of interest. Let Pn,m be the m-th synthesis unit of the n-th phoneme (the phoneme of interest) for the sake of simplicity. Synthesis units corresponding to N (N: the number of Nbest to be obtained) best distortion values in ascending order of that synthesis unit Pn,m are extracted from the preceding phoneme, Dn,m,k represents the k-th distortion value among those values, and PREn,m,k represents a synthesis unit of the preceding phoneme, which corresponds to that distortion value. Then, a sum total Sn,m,k of distortion values in a path that reaches the synthesis unit Pn,m via PREn,m,k is given by:

$$Sn,m,k = Sn-1,x,0 + Dn,m,k (\text{for } x = PREn,m,k)$$

The distortion value of this embodiment will be described below. In this embodiment, a distortion value Dtotal (corresponding to Dn,m,k in the above description) is defined as a weighted sum of the aforementioned concatenation distortion Dc and modification distortion Dt.

$$\text{Dtotal} = w \times Dc + (1-w) \times Dm : (0 \leqq w \leqq 1)$$

where w is a weighting coefficient empirically obtained by, e.g., exploratory experiments or the like. When w=0, the distortion value is explained by the modification distortion Dm alone; when w=1, the distortion value depends on the concatenation distortion Dc alone.

The distortion holding unit 412 holds N best distortion values Dn,m,k, corresponding synthesis units PREn,m,k of the preceding phoneme, and the sum totals Sn,m,k of distortion values of paths that reach Dn,m,k via PREn,m,k.

FIG. 8 shows an example wherein the minimum value of the sum totals of paths that reach the synthesis unit Pn,m of interest is "222". The distortion value—of the synthesis unit Pn,m at that time is Dn,m,1 (k= 1), and a synthesis unit of the preceding phoneme corresponding to this distortion value Dn,m,1 is PREn,m,1 (corresponding to Pn-1,m 81 in FIG. 8). Reference numeral 80 denotes a path which concatenates the synthesis units PREn,m,1 and Pn,m.

Figure 9:
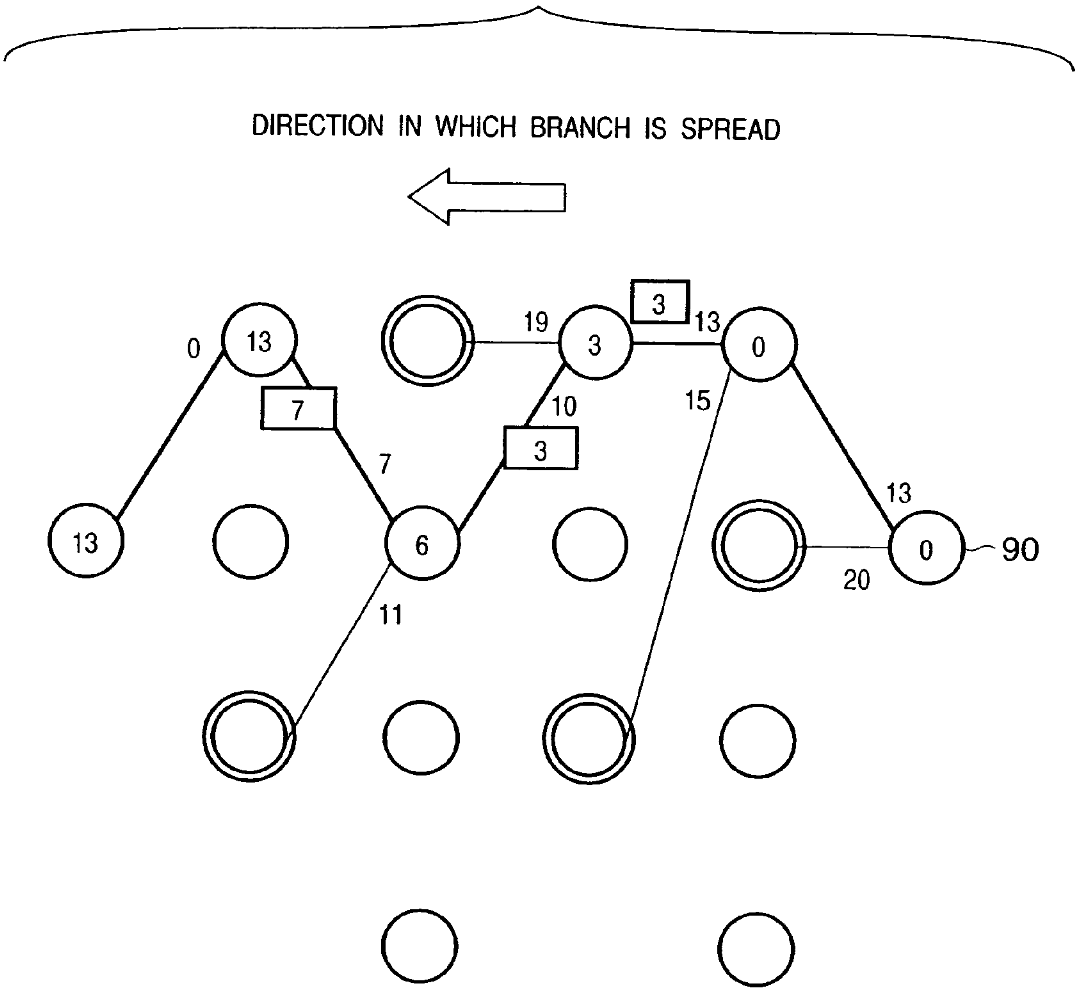
FIG. 9 is a view for explaining the determination process by Nbest.

FIG. 9 illustrates the Nbest determination process.

Upon completion of step S510, N best pieces of information have been obtained in each synthesis unit (forward search). The Nbest determination unit 413 obtains an Nbest path by spreading branches from a synthesis unit 90 at the end of a phoneme in the reverse order (backward search). A node to which branches are spread is selected to minimize the sum of the predicted value (a numeral beside each line) and the total distortion value (individual distortion values are indicated by numerals in rectangles) until that node is reached. Note that the predicted value corresponds to a minimum distortion Sn,m,0 of the forward search result in the synthesis unit Pn,m. In this case, since the sum of predicted values is equal to that of the distortion values of a minimum path that reaches the left end in practice, it is guaranteed to obtain an optimal path owing to the nature of the A* search algorithm.

FIG. 9 shows a state wherein the first-place path is determined.

In FIG. 9, each circle indicates a synthesis unit, the numeral in each circle indicates a distortion predicted value, the bold line indicates the first-place path, the numeral in each rectangle indicates a distortion value, and each numeral beside the line indicates a predicted distortion value. In order to obtain the second-place path, a node that corresponds to the minimum sum of the predicted value and the total distortion value to that node is selected from nodes indicated by double circles, and branches are spread to all (a maximum of N) synthesis units of the preceding phoneme, which are connected to that node. Nodes at the ends of the branches are indicated by double circles. By repeating this operation, N best paths are determined in ascending order of the total sum value. FIG. 9 shows an example wherein branches are spread while N=2.

As described above, according to the first embodiment, synthesis units which form a path with a minimum distortion can be selected and registered in the synthesis unit inventory.

Second Embodiment

In the first embodiment, diphones are used as phonetic units. However, the present invention is not limited to such specific units, and phonemes, half-diphones, and the like may be used. A half-diphone is obtained by dividing a diphone into two segments at a phoneme boundary. The merit obtained when half-diphones are used as units will be briefly explained below. Upon producing synthetic speech of arbitrary text, all kinds of diphones must be prepared in the synthesis unit inventory 206. By contrast, when half-diphones are used as units, an unavailable half-diphone can be replaced by another half-diphone. For example, when a half-diphone "/a.n.0/" is used in place of a half-diphone "/a.b.0/ (the left side of a diphone "a.b"), synthetic speech can be satisfactorily produced while minimizing deterioration of sound quality. In this manner, the size of the synthesis unit inventory 206 can be reduced.

Third Embodiment

In the first and second embodiments, diphones, phonemes, half-diphones, and the like are used as phonetic units. However, the present invention is not limited to such specific units, and those units may be used in combination. For example, a phoneme which is frequently used may be expressed using a diphone as a unit, and a phoneme which is used less frequently may be expressed using two half-diphones.

Figure 10:
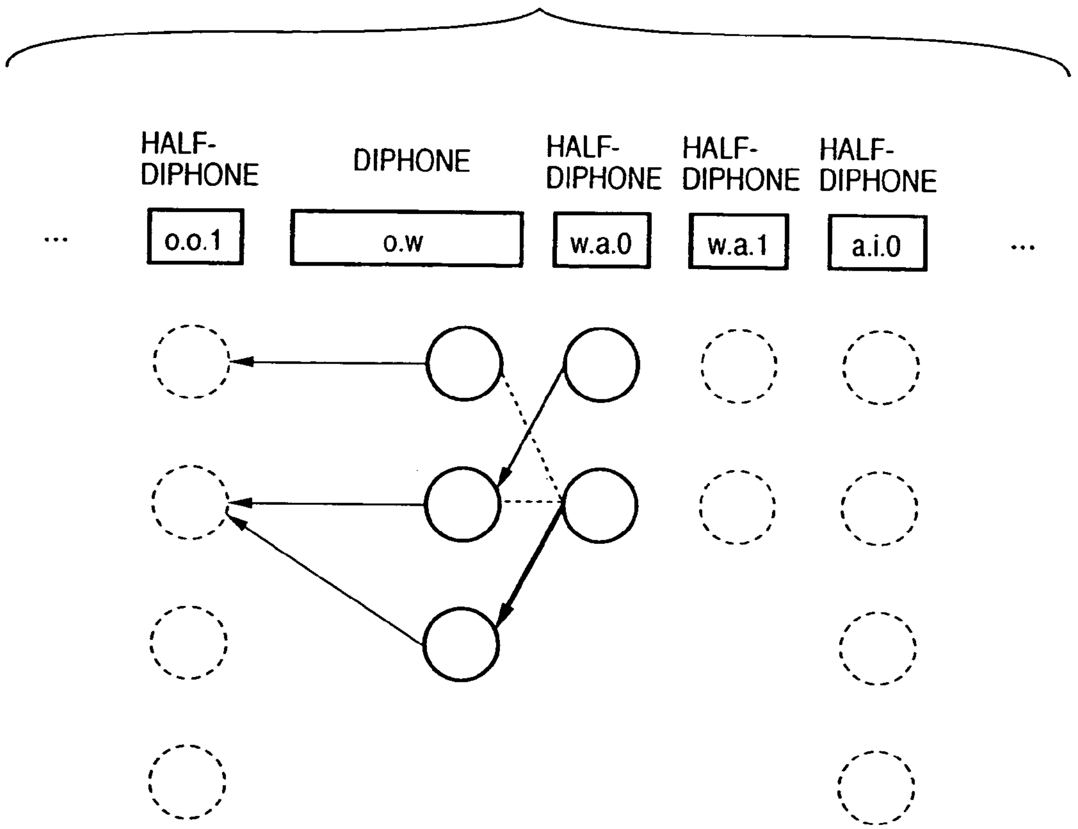
FIG. 10 is a view for explaining a case where synthesis unit units are represented by mixture of a diphone and half-diphone, according to the third embodiment of the present invention.

FIG. 10 shows an example wherein different synthesis units units mix. In FIG. 10, a phoneme "o.w" is expressed by a diphone, and its preceding and succeeding phonemes are expressed by half-diphones.

Fourth Embodiment

In the third embodiment, if information indicating whether or not half-diphone is read out from successive locations in a source database is available, and half-diphones are read out from successive locations, a pair of half-diphones may be virtually used as a diphone. That is, since half-diphones stored at successive locations in the source database have a concatenation distortion "0", a modification distortion need only be considered in such case, and the computation volume can be greatly reduced.

Figure 11:
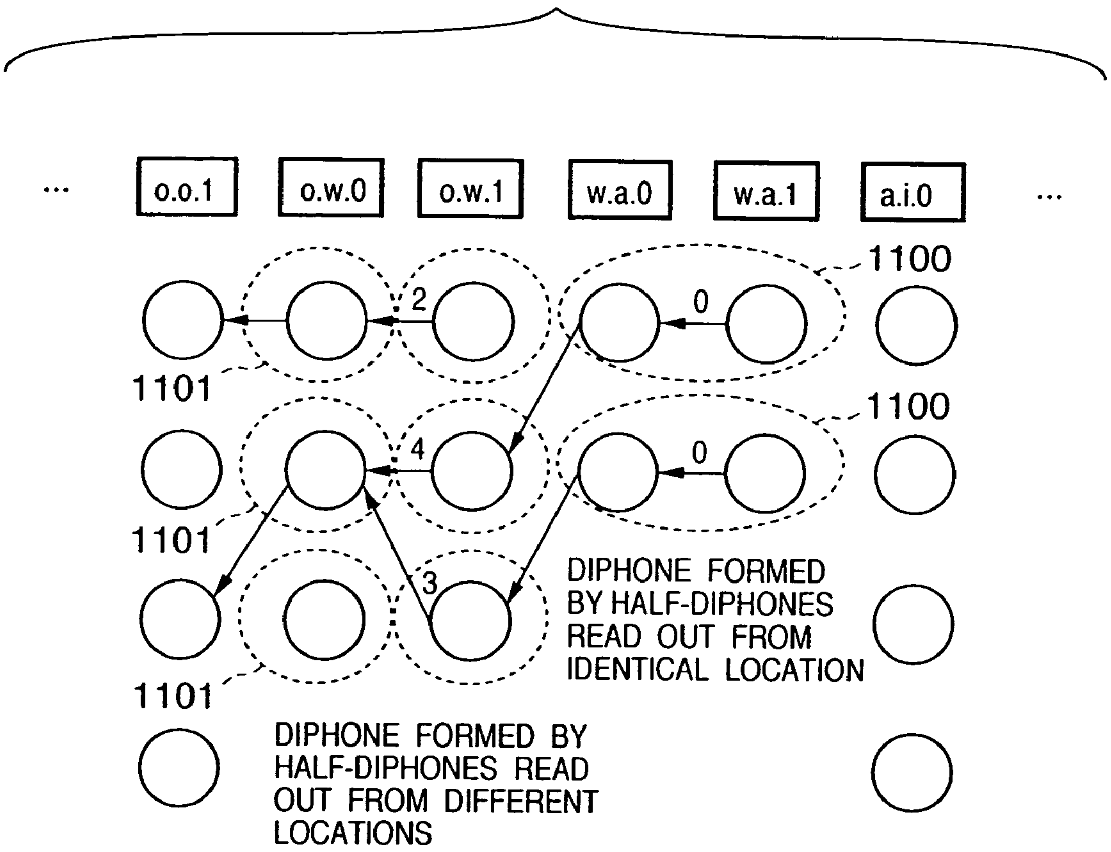
FIG. 11 is a view for explaining a case where synthesis unit units are represented by half-diphones, according to the fourth embodiment of the present invention.

FIG. 11 shows this state. Numerals on the lines in FIG. 11 indicate concatenation distortions.

Referring to FIG. 11, pairs of half-diphones denoted by 1100 are read out from successive locations in a source database, and their concatenation distortions are uniquely determined to be "0". Since pairs of half-diphones denoted by 1101 are not read out from successive locations in the source database, their concatenation distortions are individually computed.

Fifth Embodiment

In the first embodiment, the entire phoneme obtained from one unit of text data undergoes distortion computation. However, the present invention is not limited to such specific scheme. For example, the phoneme may be segmented at pause or unvoiced sound portions into periods, and distortion computations may be made in units of periods. Note that the unvoiced sound portions correspond to, e.g, those of "p", "t", "k", and the like. Since a concatenation distortion is normally "0" at a pause or unvoiced sound position, such unit is effective. In this way, optimal synthesis units can be selected in units of periods.

Sixth Embodiment

In the description of the first embodiment, cepstra are used upon computing a concatenation distortion, but the present invention is not limited to such specific parameters. For example, a concatenation distortion may be computed using the sum of differences of waveforms before and after a concatenation point. Also, a concatenation distortion may be computed using spectrum distance. In this case, a concatenation point is preferably synchronized with a pitch mark.

Seventh Embodiment

In the description of the first embodiment, actual numerical values of the window length, shift length, the orders of cepstrum, the number of frames, and the like are used upon computing a concatenation distortion. However, the present invention is not limited to such specific numerical values. A concatenation distortion may be computed using an arbitrary window length, shift length, order, and the number of frames.

Eighth Embodiment

In the description of the first embodiment, the sum total of differences in units of orders of cepstrum is used upon computing a concatenation distortion. However, the present invention is not limited to such specific method. For example, orders may be normalized using a statistical nature (normalization coefficient rj). In this case, a concatenation distortion Dc is given by:

$$Dc=\sum_{i=-2}^{2}\sum_{j=0}^{16}(rj\times|Cprei,\ j-Ccuri,\ j|)$$

Ninth Embodiment

In the description of the first embodiment, a concatenation distortion is computed on the basis of the absolute values of differences in units of orders of cepstrum. However, the present invention is not limited to such specific method. For example, a concatenation distortion is computed on the basis of the powers of the absolute values of differences (the absolute values need not be used when an exponent is an even number). If N represents an exponent, a concatenation distortion Dc is given by:

$$Dc=\Sigma\Sigma|Cprei,\ j-Ccuri,\ j|^N$$

A larger N value results in higher sensitivity to a larger difference. As a consequence, a concatenation distortion is reduced on average.

10th Embodiment

In the first embodiment, a cepstrum distance is used as a modification distortion. However, the present invention is not limited to this. For example, a modification distortion may be computed using the sum of differences of waveforms in given periods before and after modification. Also, the modification distortion may be computed using spectrum distance.

11th Embodiment

In the first embodiment, a modification distortion is computed based on information obtained from waveforms. However, the present invention is not limited to such specific method. For example, the numbers of times of deletion and copying of pitch segments by PSOLA may be used as elements upon computing a modification distortion.

12th Embodiment

In the first embodiment, a concatenation distortion is computed every time a synthesis unit is read out. However, the present invention is not limited to such specific method. For example, concatenation distortions may be computed in advance, and may be held in the form of a table.

FIG. 12 shows an example of a table which stores concatenation distortions between a diphone "/a.r/" and a diphone "/r.i/". In FIG. 12, the ordinate plots synthesis units of "/a.r/", and the abscissa plots synthesis units of "/r.i/". For example, a concatenation distortion between synthesis unit "id3 (candidate No. 3)" of "/a.r/" and synthesis unit "id2 (candidate No. 2)" of "/r.i/" is "3.6". When all concatenation distortions between diphones that can be concatenated are prepared in the form of a table in this way, since computations of concatenation distortions upon synthesizing synthesis units can be done by only table lookup, the computation volume can be greatly reduced, and the computation time can be greatly shortened.

13th Embodiment

In the first embodiment, a modification distortion is computed every time a synthesis unit is modified. However, the present invention is not limited to such specific method. For example, modification distortions may be computed in advance and may be held in the form of a table.

FIG. 13 is a table of modification distortions obtained when a given diphone is changed in terms of the fundamental frequency and phonetic duration.

In FIG. 13, $\mu$ is a statistical average value of that diphone, and $\sigma$ is a standard deviation. For example, the following table formation method may be used. An average value and variance are statistically computed in association with the fundamental frequency and phonetic duration. Based on these values, the PSOLA method is applied using twenty five (=5×5) different fundamental frequencies and phonetic durations as targets to compute modification distortions in the table one by one. Upon synthesis, if the target fundamental frequency and phonetic duration are determined, a modification distortion can be estimated by interpolation (or extrapolation) of neighboring values in the table.

Figure 14:
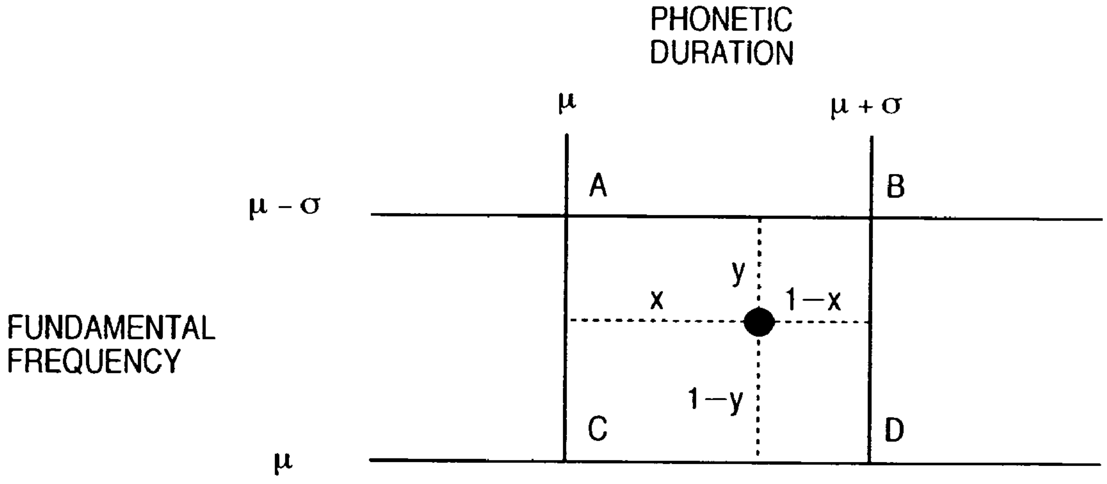
FIG. 14 is a view showing an example upon estimating a modification distortion according to the 13th embodiment of the present invention.

FIG. 14 shows an example for estimating a modification distortion upon synthesis.

In FIG. 14, the full circle indicates the target fundamental frequency and phonetic duration. If modification distortions at respective lattice points are determined to be A, B, C, and D from the table, a modification deformation Dm can be described by:

$$Dm=\{A\cdot(1-y)+C\cdot y\}\times(1-x)+\{B\cdot(1-y)+D\cdot y\}\times x$$

14th Embodiment

In the 13th embodiment, a 5×5 table is formed on the basis of the statistical average value and standard deviation of a given diphone as the lattice points of the modification distortion table. However, the present invention is not limited to such specific table, but a table having arbitrary lattice points may be formed. Also, lattice points may be conclusively given independently of the average value and the like. For example, a range that can be estimated by prosodic estimation may be equally divided.

15th Embodiment

In the first embodiment, a distortion is quantified using the weighted sum of concatenation and modification distortions. However, the present invention is not limited to such specific method. Threshold values may be respectively set for concatenation and modification distortions, and when either of these threshold values exceed, a sufficiently large distortion value may be given so as not to select that synthesis unit.

In the above embodiments, the respective units are constructed on a single computer. However, the present invention is not limited to such specific arrangement, and the respective units may be divisionally constructed on computers or processing apparatuses distributed on a network.

In the above embodiments, the program is held in the control memory (ROM). However, the present invention is not limited to such specific arrangement, and the program may be implemented using an arbitrary storage medium such as an external storage or the like. Alternatively, the program may be implemented by a circuit that can attain the same operation.

Note that the present invention may be applied to either a system constituted by a plurality of devices, or an apparatus consisting of a single equipment. The present invention is also achieved by supplying a recording medium, which records a program code of software that can implement the functions of the above-mentioned embodiments to the system or apparatus, and reading out and executing the program code stored in the recording medium by a computer (or a CPU or MPU) of the system or apparatus.

In this case, the program code itself read out from the recording medium implements the functions of the above-mentioned embodiments, and the recording medium which records the program code constitutes the present invention. As the recording medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the recording medium is written in a memory of the extension board or unit.

As described above, according to the above embodiments, since synthesis units to be registered in the synthesis unit inventory are selected in consideration of concatenation and modification distortions, synthetic speech which suffers less deterioration of sound quality can be produced even when a synthesis unit inventory that registers a small number of synthesis units is used.

The present invention is not limited to the above embodiments and various changes and modifications can be made within the spirit and scope of the present invention. Therefore, to apprise the public of the scope of the present invention, the following claims are made.

What is claimed is:

1. A synthesis unit selection apparatus comprising:

n-best obtaining means for obtaining one or more sequences of synthesis unit corresponding to a phonetic string on the basis of a distortion obtained by concatenating synthesis units;

obtaining means for obtaining a plurality of sequences by applying said n-best obtaining means to a corpus including a plurality of phonetic strings; and selection means for selecting a synthesis unit for a type of synthesis unit, when the synthesis unit appears most frequently in the plurality of sequences obtained by said obtaining means.

2. A synthesis unit selection apparatus comprising:

n-best obtaining means for obtaining one or more sequences of synthesis unit corresponding to a phonetic string on the basis of a distortion obtained by concatenating synthesis units;

obtaining means for obtaining a plurality of sequences by applying said n-best obtaining means to a corpus including a plurality of phonetic strings; and selection means for selecting one or more synthesis units for a type of synthesis unit, in an order of frequencies of appearance in the plurality of sequences obtained by said obtaining means.

3. A synthesis unit selection method comprising:

an n-best obtaining step of obtaining one or more best sequences of synthesis unit corresponding to a phonetic string on the basis of a distortion obtained by concatenating synthesis units;

an obtaining step of obtaining a plurality of sequences by applying said n-best obtaining step to a corpus including a plurality of phonetic strings; and a selection step of selecting a synthesis unit for a type of synthesis unit, when the synthesis unit appears most frequently in the plurality of sequences obtained in said obtaining step.

4. A synthesis unit selection method comprising:

an n-best obtaining step of obtaining one or more best sequences of synthesis units corresponding to a phonetic string on the basis of a distortion obtained by concatenating synthesis units;

an obtaining step of obtaining a plurality of sequences by applying said n-best obtaining step to a corpus including a plurality of phonetic strings; and a selection step of selecting one or more synthesis units for a type of synthesis unit, in an order of frequencies of appearance in the plurality of sequences obtained in said obtaining step.

5. A computer readable storage medium storing a program that implements the method recited in claim 4.

6. A synthesis unit selection apparatus comprising:

an n-best obtaining unit configured to obtain one or more sequences of synthesis units corresponding to a phonetic string on the basis of a distortion obtained by concatenating synthesis units;

an obtaining unit configured to obtain a plurality of sequences by applying said n-best obtaining unit to a corpus including a plurality of phonetic strings; and a selection unit configured to select a synthesis unit for a type of synthesis unit, when the synthesis unit appears most frequently in the plurality of sequences obtained by said obtaining unit.

7. A program for implementing a synthesis unit selection method comprising:

an n-best obtaining step module for obtaining one or more sequences of synthesis units corresponding to a phonetic string on the basis of a distortion obtained by concatenating synthesis units;

an obtaining step module for obtaining a plurality of sequences by applying said n-best obtaining step to a corpus including a plurality of phonetic strings; and a selection step module for selecting a synthesis unit for a type of synthesis unit, when the synthesis unit appears most frequently in the plurality of sequences obtained by said obtaining step module.

8. A synthesis unit selection apparatus comprising:

an n-best obtaining unit configured to obtain one or more best sequences of synthesis units corresponding to a phonetic string on the basis of a distortion obtained by concatenating synthesis units;

an obtaining unit configured to obtain a plurality of sequences by applying said n-best obtaining unit to a corpus including a plurality of phonetic strings; and a selection unit configured to select one or more synthesis units for a type of synthesis unit, in an order of frequencies of appearance in the plurality of sequences obtained by said obtaining unit.

9. A program for implementing a synthesis unit selection method comprising:

an n-best obtaining step module for obtaining one or more sequences of synthesis units corresponding to a phonetic string on the basis of a distortion obtained by concatenating synthesis units;

an obtaining step module for obtaining a plurality of sequences by applying said n-best obtaining step module to a corpus including a plurality of phonetic strings; and a selection step module for selecting one or more synthesis units for a type of synthesis unit, in an order of frequencies of appearance in the plurality of sequences obtained by said obtaining step module.

* * * * *

UNITED STATES PATENT AND TRADEMARK OFFICE

CERTIFICATE OF CORRECTION

PATENT NO. : 7,039,588 B2 Page 1 of 1
APPLICATION NO. : 10/928114
DATED : May 2, 2006
INVENTOR(S) : Yasuo Okutani et al.

It is certified that error appears in the above-identified patent and that said Letters Patent is hereby corrected as shown below:

<u>COLUMN 1</u>
Line 64, "invention, comprising:" should read --invention comprises:--.

<u>COLUMN 6</u>
Line 15, "phoneme the" should read --phoneme in the--.

Signed and Sealed this

Second Day of January, 2007

JON W. DUDAS
*Director of the United States Patent and Trademark Office*